United States Patent
Veser et al.

(10) Patent No.: US 6,478,346 B1
(45) Date of Patent: Nov. 12, 2002

(54) SNAP CLOSURE

(75) Inventors: Norbert Veser, Weinstadt; Ernst Buck, Leutenbach; Peter Bauer, Winnenden; Frank Opelka, Waiblingen, all of (DE)

(73) Assignee: Firma Andreas Stihl AG & Co. (DE)

( * ) Notice: Subject to any disclaimer, the term of this patent is extended or adjusted under 35 U.S.C. 154(b) by 0 days.

(21) Appl. No.: 09/353,112

(22) Filed: Jul. 14, 1999

(30) Foreign Application Priority Data

Jul. 14, 1998 (DE) .......................... 198 31 496

(51) Int. Cl.[7] .............................................. E05C 19/06
(52) U.S. Cl. ................... 292/91; 292/19; 292/DIG. 11; 30/390; 30/DIG. 5
(58) Field of Search .................. 24/167, 614, 625; 292/19, 80, DIG. 38, 83, 87, 91, 10, 13, 20, DIG. 11; 220/326; 30/276, 347, 388, 390, DIG. 5; 56/17.4

(56) References Cited

U.S. PATENT DOCUMENTS

| | | | | |
|---|---|---|---|---|
| 756,924 A | * | 4/1904 | Wood .......................... 292/19 |
| 3,858,954 A | * | 1/1975 | Hetterich .................... 312/244 |
| 4,200,978 A | * | 5/1980 | Irelan .......................... 30/276 |
| 4,500,120 A | * | 2/1985 | Ridgewell et al. ............. 70/58 |
| 4,912,950 A | * | 4/1990 | Crowle ........................ 292/19 |
| 5,197,426 A | * | 3/1993 | Frangesch ................ 123/198 E |
| 5,238,112 A | * | 8/1993 | Massey ...................... 206/387 |
| D345,293 S | * | 3/1994 | Bell ............................. D8/339 |
| 5,461,942 A | * | 10/1995 | Kelley ........................... 73/87 |
| 5,577,779 A | * | 11/1996 | Dangel ......................... 292/80 |
| 5,628,533 A | * | 5/1997 | Hill .............................. 292/80 |
| 5,701,681 A | * | 12/1997 | Wonka .......................... 34/97 |
| 5,950,317 A | * | 9/1999 | Yates ........................... 30/276 |
| 5,991,985 A | * | 11/1999 | Galbreath ..................... 24/625 |
| 6,052,976 A | * | 4/2000 | Cellini ......................... 56/17.4 |

* cited by examiner

Primary Examiner—Gary Estremsky
(74) Attorney, Agent, or Firm—R W Becker & Associates; R W Becker

(57) ABSTRACT

A snap closure is provided for the detachable securement of a housing cover on a housing of a manually-guided implement, especially to secure an air filter cover that covers an air filter of an internal combustion engine for driving a tool of the implement. At least one snap hook is provided on one of the components that are to be secured together, namely the cover and the housing. The snap hook is provided on an end of an elastically deflectable leg that is disposed on the one component. The snap hook is tapered in the manner of a detent and when the cover is mounted on the housing the snap hook, accompanied by an elastic return force, is engagable in an undercut provided on the other component. The snap hook is deflectable in or parallel to a surface plane on the one component that carries the snap hook.

7 Claims, 4 Drawing Sheets

SNAP CLOSURE

BACKGROUND OF THE INVENTION

The present invention relates to a snap closure for the detachable securement of a housing cover on the housing of a manually-guided implement, especially to secure an air filter cover that covers an air filter of an internal combustion engine for driving a tool of the implement.

A housing cover on the housing of a manually-guided implement is opened to provide access to the devices of the implement accommodated in the housing. The housing can be detachably secured with a snap closure. An air filter cover that covers an air filter of an internal combustion engine for driving a tool of the implement can be secured by a snap closure. The snap closure should enable as rapid an access to the air filter as possible for routine maintenance purposes. The snap closure includes a snap hook on one of the components that are to be held together, with the hook being provided on the end of an elastically deflectable leg and being tapered in the manner of a detent. When the cover is placed on the housing, the hook end of the snap hook can engage in an undercut formed on the other of the components that are to be held together. To release the snap closure connection the snap hook is pressed out of the engaged positioned and withdrawn.

With known snap closures, the undercut is formed in the wall of the component, for example by an opening or depression in the housing cover that is to be secured. For releasing the securement, the snap hook is pressed out of the plane of the housing cover; likewise, prior to engagement of the snap hook in the undercut the housing cover presses the legs into the interior of the housing. With such an arrangement, the components of the implement that are accommodated in the housing must be spaced from the wall of the housing by a distance that is greater than the required deflection path of the snap hook. With manually-guided implements, the housing should be as small as possible, as a consequence of which a space available behind the snap hooks for the deflection should also be kept as small as possible, and customarily barely exceeds the required extent of deflection. Especially during release of the snap closure jamming is frequently observed since the snap hook is halted in its deflection movement by the components disposed in the housing and still partly overlaps the undercut and can therefore not be withdrawn. A user of the implement must therefore use both hands to release the snap closure in order on the one hand to press the snap hook down and on the other hand to release and withdraw the housing cover.

It is therefore an object of the present invention to improve a snap closure of the aforementioned general type in such a way that with as small of an overall size of the housing as possible a straight-forward securement and release of the housing cover is possible.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

The snap closure of the present invention comprises at least one snap hook on one of the components that are to be secured together, namely the cover and the housing, wherein the snap hook is provided on an end of an elastically deflectable leg that is disposed on the one component, wherein the snap hook is tapered in the manner of a detent and when the cover is mounted on the housing the hook, accompanied by an elastic return force, is engageable in an undercut provided on the other component, and wherein the snap hook is deflectable in or parallel to a surface plane of the one component that carries the snap hook.

With a snap closure embodied in this manner, the overall volume of the housing is determined independently of the deflection requirements of the snap hook and exclusively by the dimensions of the implement devices that are to be accommodated within the housing. The housing can therefore be of minimal size, and the inner housing wall, even in the vicinity of the snap closure, can be disposed directly adjacent to the components accommodated in the housing. In this connection, the undercut extends at right angles to the surface plane of the component that holds the snap hook. The deflection path of the snap hook can be selected in any desired manner and thus enables a reliable release of the snap closure.

The snap hook is advantageously disposed on the cover and the associated undercut is part of the housing, whereby the snap closure can be released in a simple manner with one hand. Pursuant to one preferred specific embodiment of the present invention, two parallel snap hooks of the same length are provided and are deflectable in opposite directions. If one of the snap hooks is accidentally pressed during use of the implement by bumping the housing against a foreign object, and such snap hook is pressed out of the engagement position, the snap closure is still held in the arresting position by the other snap hook. The snap hooks are expediently deflectable toward one another and by such opposition can be released out of the engagement position by a simple gripping movement of the operator's hand. An abutment or stop rib can be disposed between the snap hooks and determines the displacement path of the snap hooks as a consequence of its respective spacing relative to the inner back sides of the snap hooks. This prevents excessive pressing together of the snap hooks. In contrast, with conventional snap closures the hook leg can break if the snap hook is deflected beyond the limit of elasticity of the hook material, especially with incorrect operation of the snap closure, particularly when a hollow space is disposed on the back side of the snap hook.

Further specific features of the present invention will be described in detail subsequently.

DESCRIPTION OF PREFERRED EMBODIMENTS

Figure 1:
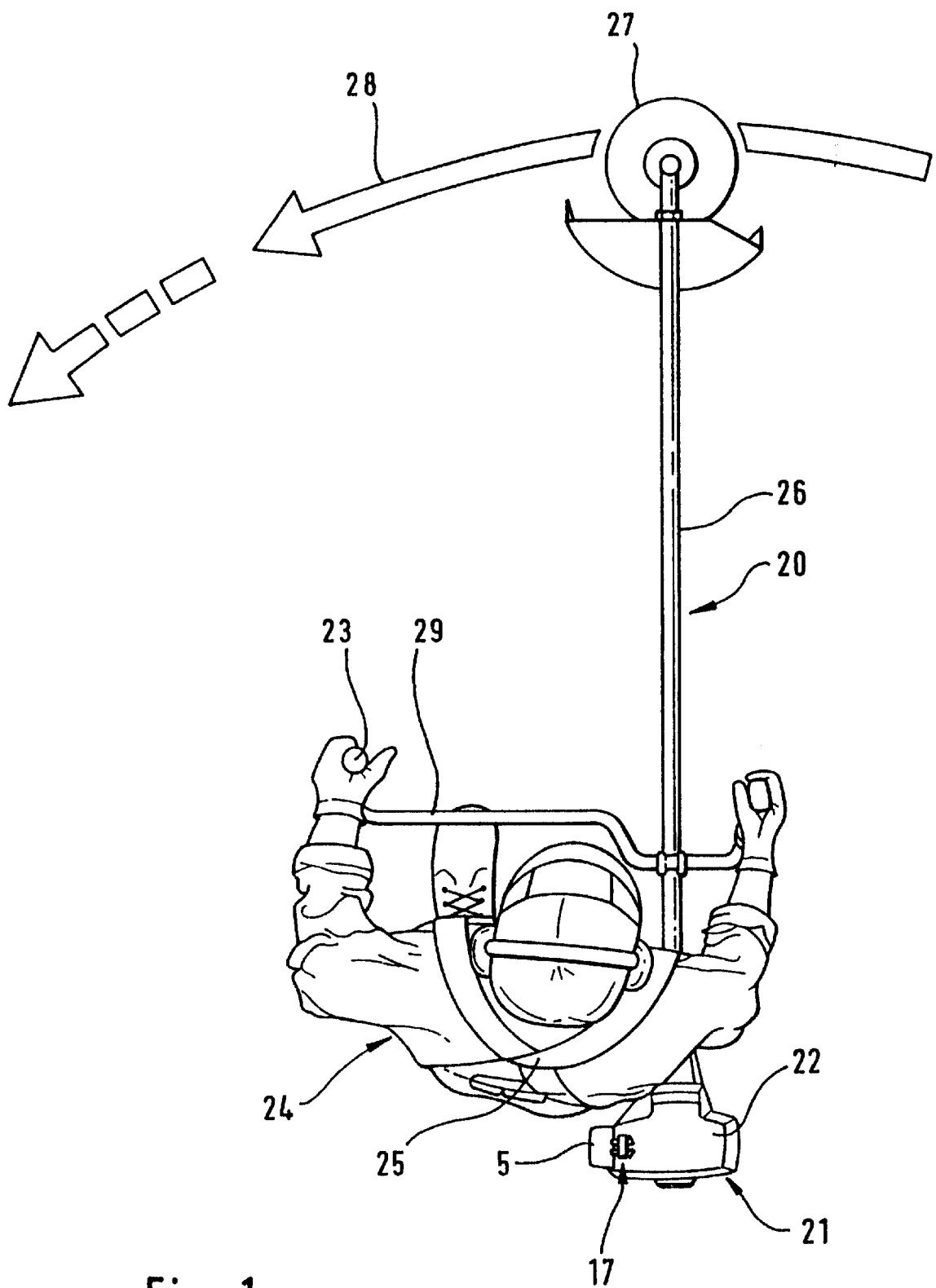
FIG. 1 shows a manually-guided implement, the housing cover of which is secured on the drive housing by means of one exemplary embodiment of the inventive snap closure.

Referring now to the drawings in detail, FIG. 1 illustrates a manually-guided tool or implement 20, the tool 27 of which is driven by an internal combustion engine that is accommodated in a housing 22 of the drive unit 21. In the illustrated embodiment, the implement 20 is a trimmer or brush cutter for mowing grass, undergrowth and the like, and includes a guide rod 26, on the end of which is disposed a rotating cutting blade as the tool 27. An operator 24 carries the implement by means of a belt system 25, and guides the cutting blade 27 back and forth in the direction of the arrow 28. Secured to the guide rod 26 is a handle bar 29 that has grips 23 at its ends for the operator 24

The housing 22 of the drive unit 21 is compact in order to ensure a simple guidance of the implement. An air filter of the internal combustion engine is located in the housing 22 and is accessible by removing an air filter cover 5, which is secured in position by a snap closure 17. The snap closure will be explained in detail subsequently with the aid of the remaining drawings. To facilitate illustration, the same reference numerals are used in all of the drawings for the same components.

Figure 3:
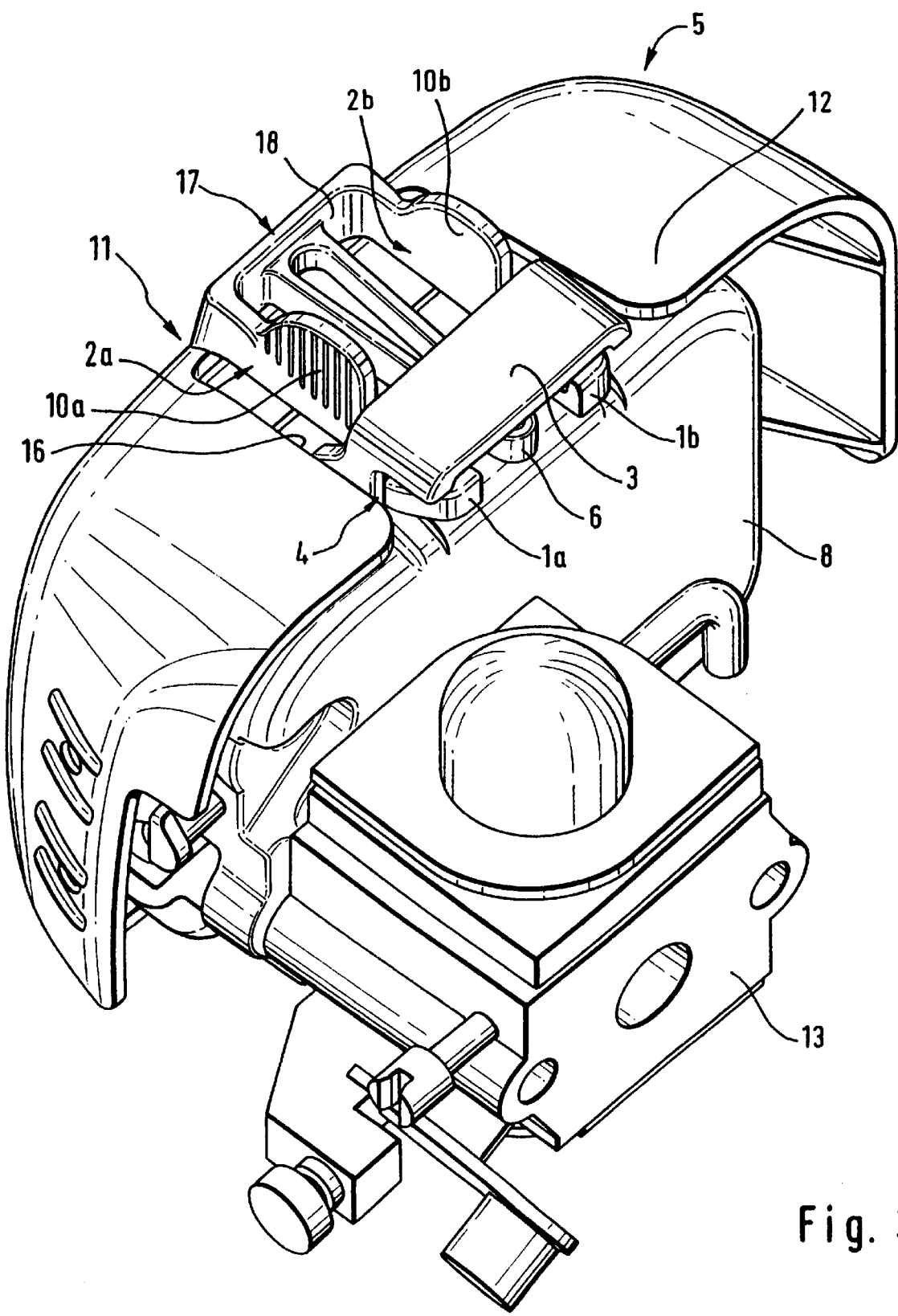
FIG. 3 is a view of an air filter cover in the assembled State.

As shown in FIG. 3, an inner chamber is defined in the air filter cover 5 by a planar end face 11 and similarly essentially planar peripheral surfaces 12 that extend at approximately right angles to the end face 11. An air filter housing 8 is accommodated in the inner chamber and an air filter is disposed in the air filter housing. Connected to the air filter housing 8 is a carburetor 13 in which fuel is added to the clean air coming from the filter for the purpose of forming a mixture. The air filter cover 5 is removable or detachable from the air filter housing 8 by means of the snap closure 17. This snap closure includes two parallel snap hooks 1a, 1b on parallel legs 2a, 2b of the same lengths. The legs 2a, 2b are secured to the air filter cover 5 and can be deflected parallel to the plane of the peripheral sides 12 of the filter cover 5. Projecting from the surface of the air filter housing 8 is a snap socket 3 into which the snap hooks 1a, 1b can be introduced, with the hook ends being adapted to engage or catch in an undercut 4 of the snap socket 3.

Figure 2:
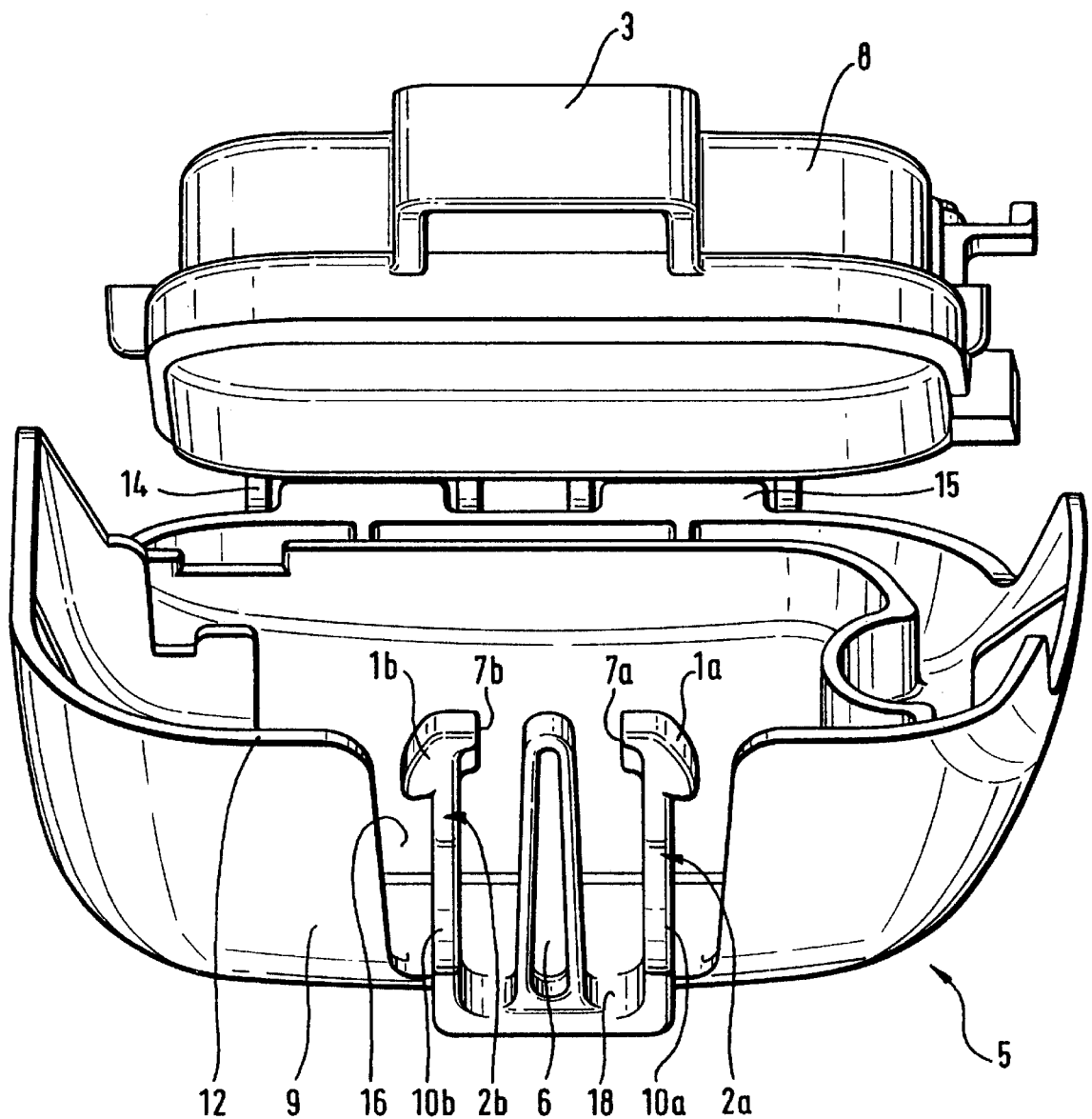
FIG. 2 is a view of an air filter cover with the inventive snap closure in the unassembled state.

The air filter cover 5 is pivotably mounted opposite the peripheral side 12 and the snap closure 17. As shown in FIG. 2, for such a pivotable support of the air filter cover projections 15 are formed on the rim of the end face 11 and can be inserted into eyes 14 that are secured to the air filter housing 8. The eyes 14 are provided with beveled edges in order to facilitate introduction of the projections 15 of the air filter cover 5. After the projections 15 have been inserted into the eyes 14, the air filter cover 5 is closed via a pivoting movement, whereby the snap hooks 1a, 1b are introduced into the snap socket 3 on the air filter housing 8.

The legs 2a, 2b of the snap hooks are disposed in a recess 16 of the peripheral side 12 of the air filter cover 5 and are movable in the plane of the air filter cover. The snap hooks 1a, 1b are each tapered or come to a point in the manner of a detent on those sides that face away from one another. When the snap hooks are introduced into the snap socket 3, the inclined outer surfaces of the snap hooks come to rest against the rim wall of the snap socket and are displaced inwardly. When the appropriate penetration depth into the snap socket 3 has been reached, the snap hooks 1a, 1b achieve the level of an undercut 4 that is vertically formed in the snap socket 3 and engage, in the deflected position, in the undercut due to the elastic return force.

Formed between the snap hooks 1a, 1b and their legs 2a, 2b is an abutment or stop rib 6 that limits the deflection path of the snap hooks 1a, 1b. The abutment rib or element 6, as are the legs 2a, 2b of the snap hooks, is based on a base plate 18 that is integrally or monolithically formed on the air filter cover 5. The respective distance between the abutment rib 6 and the inner back side 7a, 7b of the snap hooks 1a, 1b is at least 1.2 times the engagable depth of the hooks. If the snap hooks 1a, 1b are deflected until they rest against the abutment rib 6, they are in each case brought out of engagement with the undercut 4 and the ail securement of the snap closure is released. Since the deflection of the snap hooks 1a, 1b is limited, no detrimental increased stress can result in the elastically deflected legs 2a, 2b. Material fatigue of the snap hooks and their legs is precluded. The abutment rib 6 is tapered to its free end between the snap hooks 1a, 1b, as a result of which the back sides 7a, 7b of the snap hooks can come to rest with their entire surface.

Referring again to FIG. 3, the undercut 4 is disposed in an axial location of the snap socket 3, which, taking into consideration the length of the snap hooks 1a, 1b, corresponds to the assembled position of the air filter cover 5. The snap hooks 1a, 1b and their legs 2a, 2b are freely movable exclusively in the plane of the air filter cover 5, i.e. the peripheral side 12 thereof. The peripheral side 12 of the air filter cover 5 can therefore be directly adjacent to the air filter housing 8, which is covered by the cover 5, since the body of the air filter housing 8 does not adversely affect the deflection movements of the snap closure 17 in the plane of the cover 5.

Respective press areas or heads 10a, 10b project from the legs 2a, 2b on the free sides across from the cover 5 to release the snap closure 17. The press heads 10a, 10b are planar and extend in the direction of the legs 2a, 2b of the snap hooks; the press heads are disposed approximately in the middle of the legs. The oppositely disposed press heads 10a, 10b are operated in a simple manner by an oppositional gripping movement with the thumb and index finger of one hand. The snap hooks 1a, 1b are held with a slight holding force in the deflected, released position and are pulled out of the snap socket 3, thus releasing the air filter cover 5 with one hand from the housing of the implement.

Figure 4:
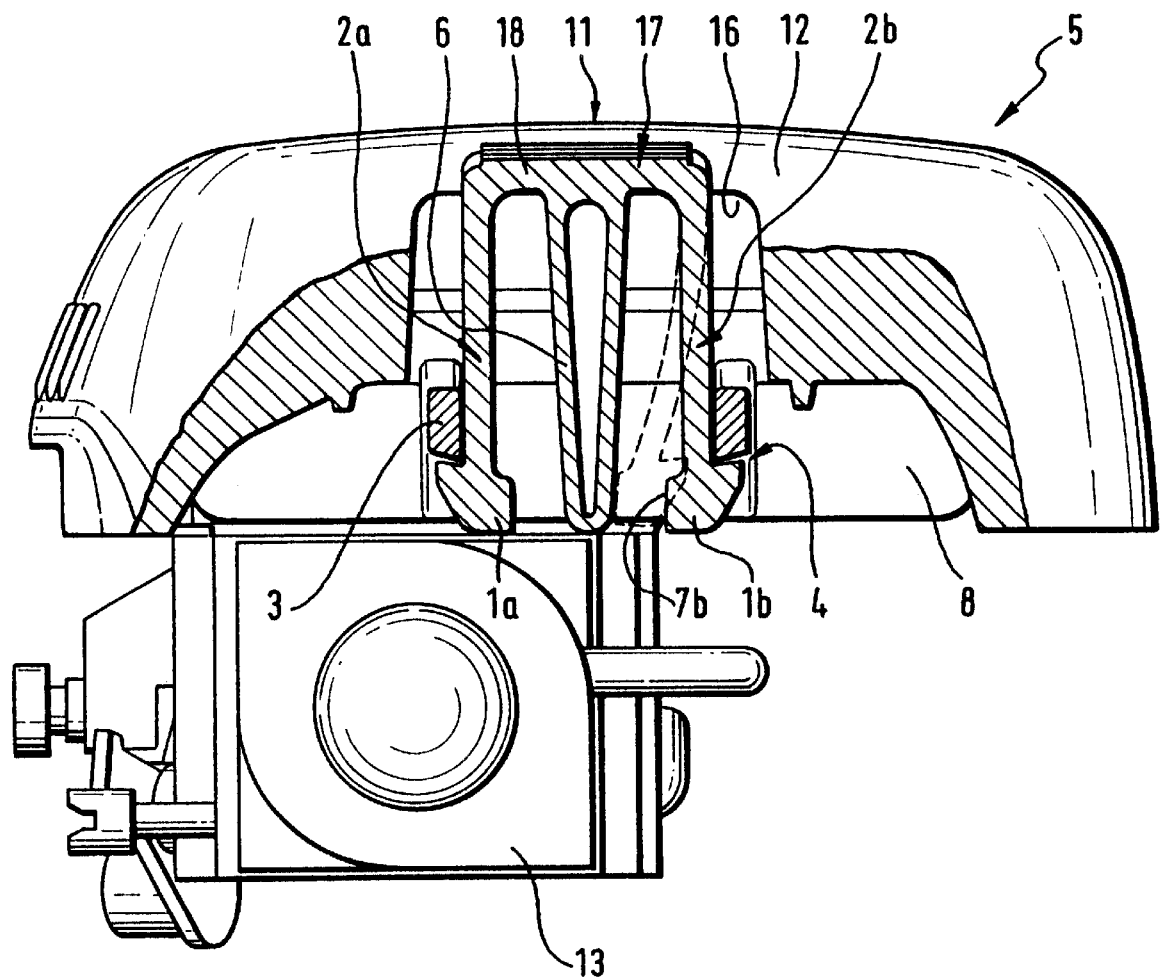
FIG. 4 is a partially cross-sectioned view of an air filter cover with one exemplary embodiment of the inventive snap closure.

The partially cross-sectioned plan view of the air filter cover of FIG. 4 clearly shows the one-piece configuration of the double snap hook closure 17 with the air filter cover 5. The legs 2a, 2b, and the snap hooks 1a, 1b formed on the free ends thereof, as well as the abutment rib 6 that is disposed between the snap hooks, project out of the plane of the cover wall 12 and are additionally supported by the base plate 18. The deflected position of one snap hook 1b is illustrated by dashed lines; in this position, the inner back side 7b of the snap hook comes to rest against the abutment rib 6 and the hook 1b is brought out of the position where it engages the undercut 4 of the snap socket 3. The width of the opening of the snap socket 3 to allow the snap hooks 1a and 1b to pass through corresponds approximately to the spacing of the outer surfaces of the legs 2a, 2b in the rest position thereof. However, it can also be advantageous to make the opening of the snap socket 3 slightly narrower, as a result of which the legs 2a, 2b are held under tension in the engaged position and hold the snap hooks 1a, 1b with greater reliability in the locking overlapping position with the undercut 4 of the snap socket 3.

The inventive snap closure can be used for securing the housing cover of any type of manually-guided implement whose tool is driven by an internal combustion engine, for example, power chain saws, disc cutters or cut-off saws, compressed air devices, etc.

The specification incorporates by reference the disclosure of German priority document 198 31 496.5 of Jul. 14, 1998.

The present invention is, of course, in no way restricted to the specific disclosure of the specification and drawings, but also encompasses any modifications within the scope of the appended claims.

What is claimed is:

1. A snap closure and undercut mounted on a housing cover and housing for the detachable securement of the housing cover on the housing of a manually-guided implement, comprising:

two snap hooks on said cover, wherein said snap hooks are provided on an end of an elastically deflected leg that is disposed on said one cover, wherein said snap hooks are tapered in the manner of a detent and when said cover is mounted on said housing said snap hooks, having an elastic return force, is engageable in said undercut provided on said housing, wherein said snap hooks are provided on two parallel legs of the same length, said snap hooks deflected parallel to a surface plane of a peripheral wall of said cover in a direction toward one another, and wherein said undercut is provided in a snap socket that projects from a surface of said housing, wherein said snap socket is formed as an arc over said snap hooks.

2. A snap closure according to claim 1, wherein parallel legs of the same length are deflectable in opposite directions.

3. A snap closure according to claim 1, wherein an abutment rib is disposed between said two snap hooks.

4. A snap closure according to claim 3, wherein said abutment rib is spaced from an inner back side of each of said snap hooks by a distance that corresponds to at least 1.2 times an engageable depth of said hooks.

5. A snap closure according to claim 3, wherein sides of said legs 2a, 2b that face away from one another are provided with a respective actuating member 10a, 10b for releasing said snap closure 17.

6. A snap closure according to claim 5, wherein each of said actuating members 10a, 10b is embodied as a planar area that extends in a direction of said legs 2a, 2b of said snap hooks 1a, 1b.

7. A snap closure according to claim 1, wherein said at least one snap hook is disposed in a recess of a wall of said cover.

* * * * *